United States Patent
Kim et al.

[11] Patent Number: 6,151,487
[45] Date of Patent: Nov. 21, 2000

[54] DEMODULATION STRUCTURE FOR FAST FADING CELLULAR CHANNELS

[75] Inventors: In-Kyung Kim, North Potomac; Wonjin Sung, Germantown, both of Md.

[73] Assignee: Hughes Electronics Corporation, El Segundo, Calif.

[21] Appl. No.: 09/387,348

[22] Filed: Aug. 31, 1999

[51] Int. Cl.[7] .................................................. H04B 17/02
[52] U.S. Cl. .......................... 455/134; 455/503; 455/504; 455/135
[58] Field of Search ..................... 455/134, 504, 455/503, 135, 102, 132, 139, 242.1, 337, 514; 375/14, 94, 101, 227, 340, 346, 96, 59

[56] References Cited

U.S. PATENT DOCUMENTS

| | | | |
|---|---|---|---|
| 5,285,480 | 2/1994 | Chennakeshu et al. .................. | 375/101 |
| 5,353,307 | 10/1994 | Lester et al. .............................. | 455/504 |
| 5,909,465 | 6/2000 | Bottomley et al. ....................... | 455/135 |
| 6,075,814 | 6/2000 | Yamano et al. ........................... | 455/574 |

*Primary Examiner*—Reinhard J. Eisenzopf
*Assistant Examiner*—Greta J. Fuller
*Attorney, Agent, or Firm*—John T. Whelm; Michael W. Sales

[57] ABSTRACT

A demodulator and demodulating technique is provided which automatically switches modes according to the flat-fading or multipath channel status of an incoming signal. If an incoming signal has delay spread in addition to fading a standard Maximum Likelihood Sequence Estimator (MLSE) equalization is selected as an optimum demodulation mode. If the incoming signal is only flat-fading a symbol-based demodulation mode is selected. The Maximum Likelihood Sequence Estimator (MLSE) equalizer mode is thus integrated with the symbol based mode. Channel status is first identified in order to do mode selection in the demodulator. A dual-mode receiver for demodulating both flat-fading and multipath signals in a communications system (FIG. 1) comprises a Baseband Digital Signal (DSP) Processor further comprising a Channel Identification Processor, the Channel Identification Processor computing a Maximum Likelihood Sequence Estimate $\hat{\underline{x}}=(\hat{x}_0 \ \hat{x}_1)^t$ of a first ray channel response and a second ray channel response $x_0$ and $x_1$, t denoting a transpose, and determining a demodulation mode based upon a squared magnitude ratio $\Gamma$ of $\hat{x}_1$ and $\hat{x}_0$ relative to a predetermined threshold.

22 Claims, 8 Drawing Sheets

DUAL-MODE TWO RECEIVERS BLOCK DIAGRAM FOR THE CELLULAR CHANNEL

BASIC TDMA RADIO LINK

DUAL-MODE TWO RECEIVERS BLOCK DIAGRAM FOR THE CELLULAR CHANNEL

DUAL-MODE ONE-RECEIVER BLOCK
DIAGRAM FOR THE CELLULAR CHANNEL

HIGH LEVEL BLOCK DIAGRAM OF
THE IMPROVED DEMODULATOR

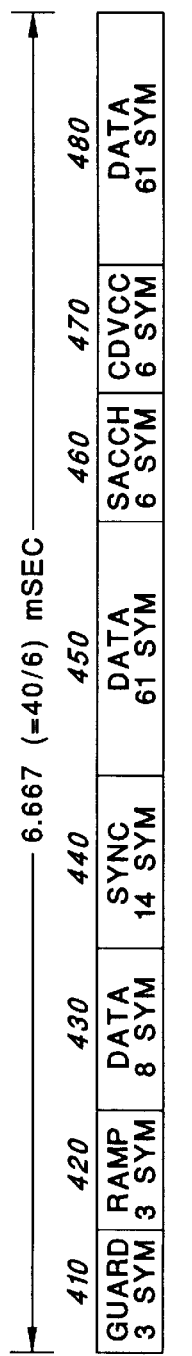
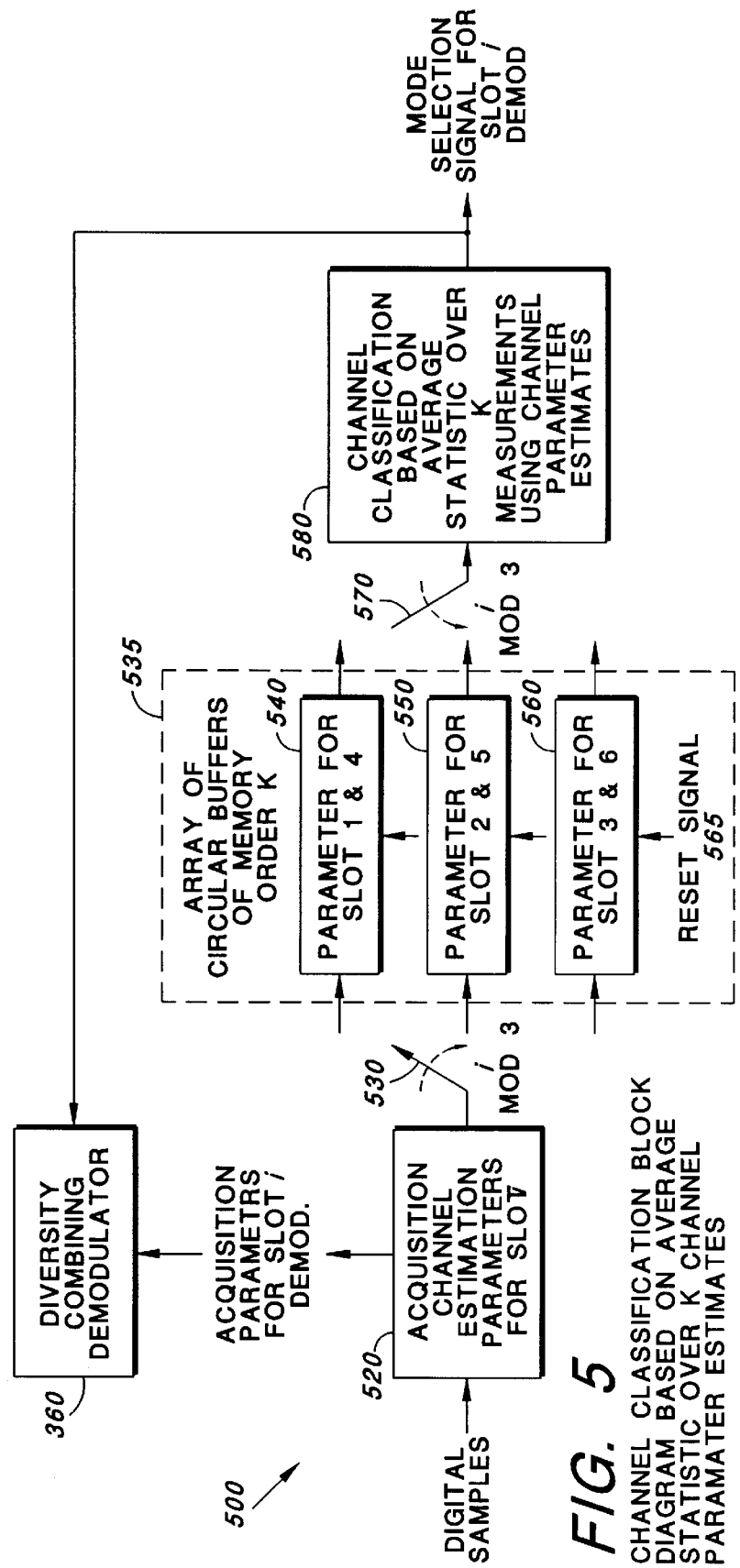
FIG. 4 IS-136 REVERSE (UPLINK) SLOT FORMATION
FIG. 5 CHANNEL CLASSIFICATION BLOCK DIAGRAM BASED ON AVERAGE STATISTIC OVER K CHANNEL PARAMATER ESTIMATES

MODIFIED RECEIVER OPERATIONAL FLOW CHART

TWO-RECEIVER OPERATIONAL FLOW CHART

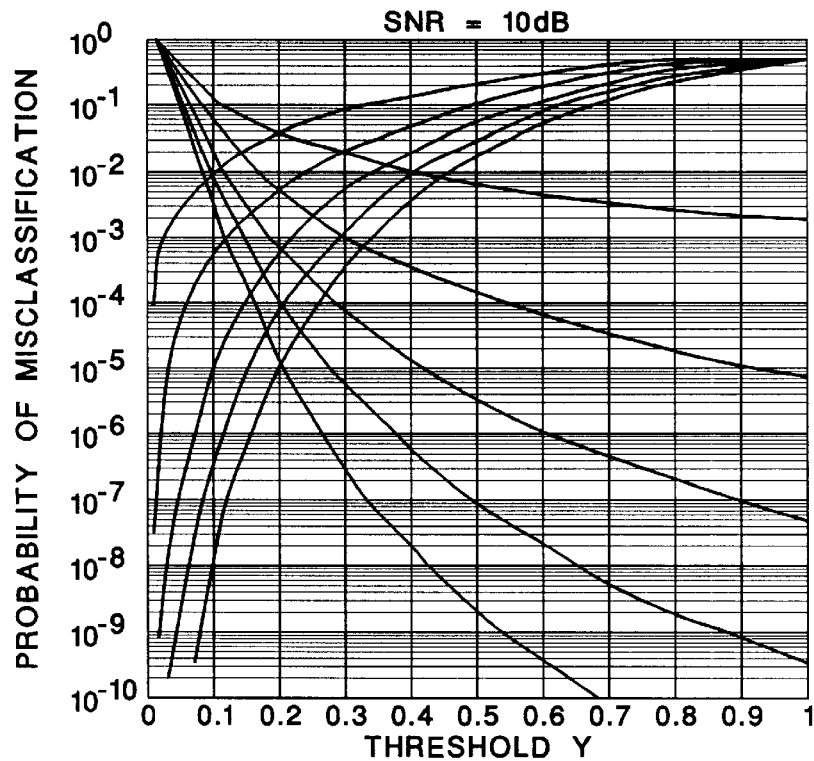
FIG. 7 PROBABILITY OF MIS-CLASSIFICATION BETWEEN FLAT FADING AND TWO-RAY FADING CHANNELS AT SNR=10dB.
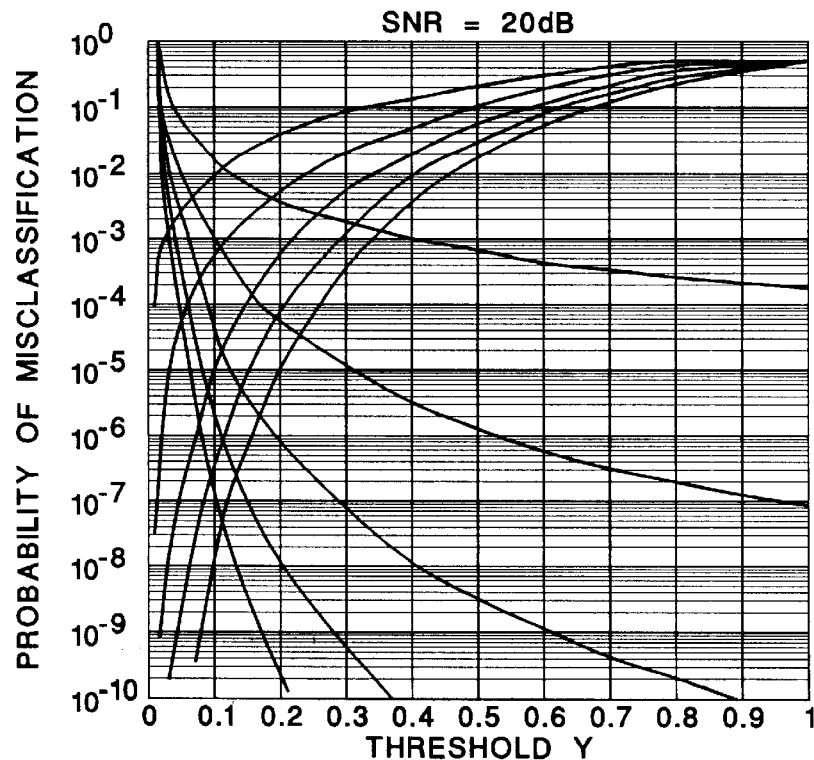
FIG. 8 PROBABILITY OF MIS-CLASSIFICATION BETWEEN FLAT FADING AND TWO-RAY FADING CHANNELS AT SNR=20dB.

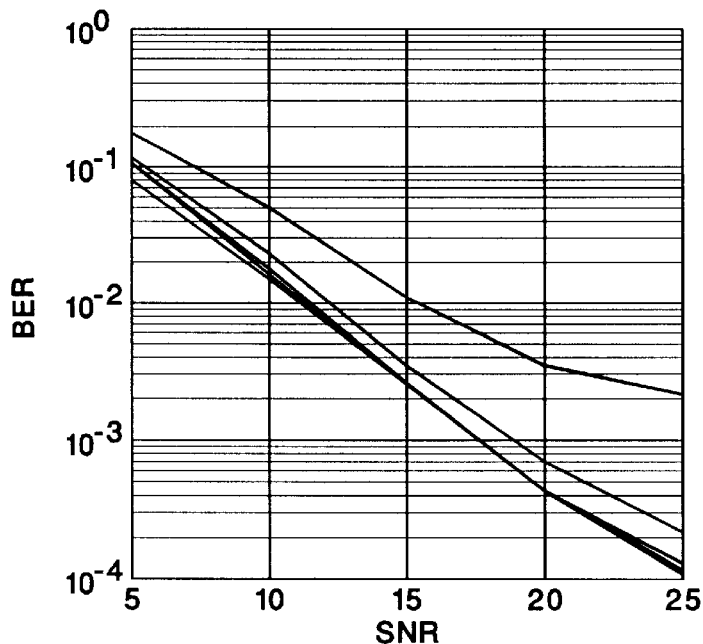
FIG. 9   BER PERFORMANCE OF COMBINED MLSE/SYMBOL-DETECTION SCHEME FOR FLAT FADING CHANNEL WITH DOPPLER SPREAD.
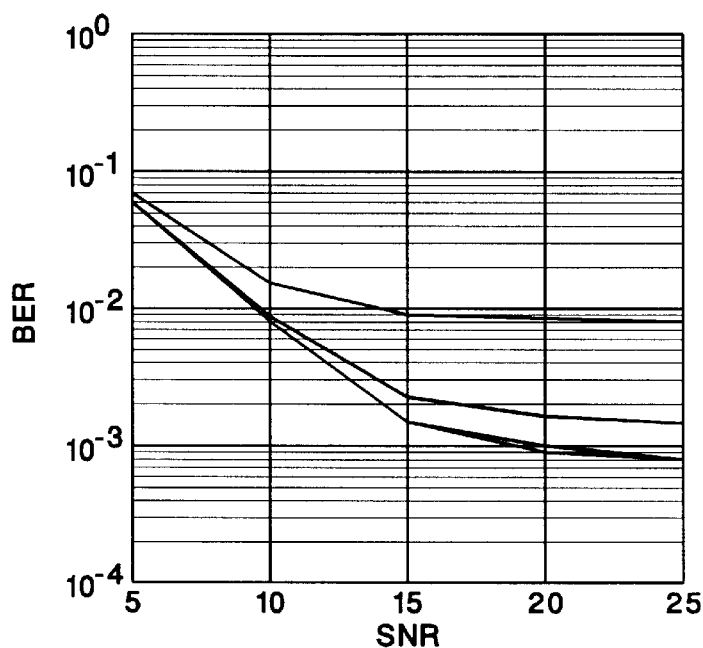
FIG. 10   BER PERFORMANCE OF COMBINED MLSE/SYMBOL-DETECTION SCHEME FOR TWO-RAY FADING CHANNEL WITH DOPPLER SPREAD $f_D$=184 Hz AND THRESHOLD $\gamma$=0.2.

DEMODULATION STRUCTURE FOR FAST FADING CELLULAR CHANNELS

BACKGROUND OF THE INVENTION

The present invention relates to a demodulator and a demodulation scheme which combines both a Maximum Likelihood Sequence Estimator (MLSE) and Symbol Based detection structure and operation for optimum performance for channels with and without delay spread, and more particularly to such a demodulator and demodulation scheme used in conjunction with a Time Division Multiple Access (TDMA) cellular standard. Even more particularly, the present invention relates to such a demodulator and demodulation scheme used in conjunction with an IS-136 North American TDMA Cellular Standard operated at cellular and PCS frequencies.

In mobile cellular communications systems, a signal transmitted from or received by a mobile station and received by or transmitted from a base station is subject to certain types of corruption of the signal. One typical type of corruption is fading. Fading relates from fluctuations in signal strength that are due to the mobility and speeds of the mobile stations. Fading directly relates to the rate of the mobile station's speed. Typically, a mobile station moving at about 60 mph will induce a "fast fading" environment. Mobile stations moving at less than 10 mph, on the other hand, provide a "slow fading" environment. The associated constructive and destructive interference of the signal results from the changing distances between the base station and the mobile station, and the presence of multiple copies of a transmitted signal with different phase-offsets arriving at a receiver simultaneously.

Additionally, there is corruption induced from "delay spreading", or "multipath". Delay spreading, or multipath, occurs when the signal transmitted from the mobile has been deflected from large structures such as buildings and mountains creating multiple distinguishable time-offset copies at the receiver.

A "delay spread signal" also exhibits fading because of the mobility of the mobile station. A "flat-fading signal" by definition does not exhibit delay spread, but does exhibit fading. In general, 90% of all incoming signals from a mobile communication system are flat-fading signals (and thus do not exhibit delay spread) and less than 10% experience multipath interference (and thus exhibit both fading and delay spread).

A conventional TDMA receiver optimizes the receiver for reception of the multipath distorted signal by implementing an equalizer to receive a transmitted burst. The IS-137A and IS-138A (receiver/transmitter performance specification for the IS-136A) standards all use equalizers at a receiver. If the receiver has a non-equalizer option, it must be manually turned on or off at the receiver.

Unfortunately, if the equalizer is used in a "fast flat-fading" channel, degradation of about 2–3 dB usually occurs in a signal. If the fast fading rate is larger than 100 hertz (equivalent to mobile speed of about 100 kilometers per hour at cellular band and 50 kilometers per hour at PCS band respectively for IS-136 channels) then performance loss is about 2–4 dB as compared to a receiver optimized for the fast flat-fading channel. This occurs because the receivers have been designed to operate without any prior knowledge of channel status.

Since such performance loss occurs more than 90% of the time it is desirable to automatically switch the mode of the receiver based upon the channel status.

A conventional cellular receiver uses an MLSE equalizer and employs Diversity Combining and Least Means Square (LMS) channel tracking algorithms.

A conventional MLSE receiver performs demodulation by selecting data sequences with the highest probability of transmission. Many forms of MLSE receivers have successfully implemented corrections to inter-symbol interference (ISI) encountered in mobile radio channels. But while MLSE receivers have a desirable structure to equalize fading channels with delay spreads and multipath characteristics, they are not the best demodulators when applied to flat-fading channels with no delay spread. This is particularly the case if the channel estimator of the receiver produces incorrect channel parameters that determine tap weights for MLSE due to a fast fading rate or a low signal strength in a training sequence.

Demodulators using symbol based detection algorithms, however, severely impair the performance on channels having non-zero delay spread.

The present invention advantageously addresses the above and other needs by combining the desirable features of two demodulation modes.

SUMMARY OF THE INVENTION

The present invention advantageously addresses the needs above as well as other needs by providing a demodulator and demodulating technique that automatically switches modes according to a flat-fading or multipath channel status of an incoming signal. If an incoming signal has delay spread in addition to fading a standard Maximum Likelihood Sequence Estimator Equalizer (MLSE) is selected as an optimum receiver structure for a channel. If the incoming signal is only flat-fading a symbol-based receiver structure is selected as the optimum structure for the associated non-dispersive channel. In this way, the Maximum Likelihood Sequence Estimator (MLSE) is integrated with the symbol based receiver to optimize 100% of the incoming signals. Channel status is first identified in order to do mode selection in the demodulator. A SYNC pattern is used in conjunction with a correlation method, comparing a known SYNC pattern with a received SYNC pattern, in order to perform channel classification.

A dual-mode receiver for demodulating both flat-fading and multipath signals in a communications system comprises a Baseband Digital Signal Processor (DSP); and further comprises a Channel Identification Processor, and a Diversity Combiner coupled to the Channel Identification Processor. The channel identification processor estimates the first ray channel response $x_0$, and the second ray channel response $x_1$ as follows: The Channel Identification Processor computes a Maximum Likelihood Estimate $\hat{\underline{x}} = (\hat{x}_0\ \hat{x}_1)^t$ of $x_1$, and $x_0$, t denoting a transpose, and, in addition, determines one of a group of demodulation modes based upon a value of a squared magnitude ratio $\Gamma$ of $\hat{x}_1$ and $\hat{x}_0$ relative to a predetermined threshold based upon system optimization requirements.

In a variation of the dual-mode receiver, a squared magnitude ratio $\Gamma_1$ for a single received slot is computed as:

$$\Gamma_1 = |\hat{x}_1|^2 / |\hat{x}_0|^2.$$

In another variation of the dual-mode receiver a squared magnitude ratio $\Gamma_K$ for k multiple slots up to a maximum K slots is computed as:

$$\Gamma_K = \frac{\sum_{k=1}^{K} |\hat{x}_1(k)|^2}{\sum_{k=1}^{K} |\hat{x}_0(k)|^2}.$$

In another embodiment of the dual-mode receiver, the Channel Identification Processor sends a mode selection signal to the Diversity combiner identifying the determined demodulation mode.

In a further embodiment of the dual-mode receiver, an Equalizer is coupled to the Diversity Combiner for demodulating the multi-path signals according to a Maximum Likelihood Sequence Estimation (MLSE) process and a Channel Tracker is coupled to the Diversity Combiner for updating channel information.

In another embodiment a first mode selection signal A is set to disable First Antenna multipath channel taps, a second mode selection signal B is set to disable Second Antenna multipath channel taps, and the dual-mode receiver further comprises a symbol-based receiver coupled to the Baseband DSP to nearly optimize demodulation of the received baseband digital samples.

BRIEF DESCRIPTION OF THE DRAWINGS

The above and other aspects, features and advantages of the present invention will be more apparent from the following more particular description thereof, presented in conjunction with the following drawings wherein:

FIG. 4 is an illustration of conventional IS-136 reverse (up-link) slot formation used in the receiver of FIG. 2 and technique of FIG. 3;

FIG. 5 is a block diagram of channel classification based on average statistics over K channel parameter estimates used in the receiver of FIG. 2;

FIG. 7 is a graph of probability of mis-classification between flat-fading and two-ray fading channels at SNR equals 10 dB such as may be achieved by the demodulation techniques of FIGS. 6A and 6B;

FIG. 8 is a probability curve of mis-classification between flat-fading and two-ray fading channels at SNR equals 20 dB such as may be achieved by the demodulation techniques of FIGS. 6A and 6B;

FIG. 9 is a BER performance curve of combined MLSE/symbol-detection scheme for a flat-fading channel with a doppler spread $f_d$=184 hertz and threshold $\gamma$=0.2 such as may be achieved by the demodulation techniques of FIGS. 6A and 6B; and FIG. 10 is a BER performance curve of combined MLSE/symbol-detection scheme for two-ray fading channels with a doppler spread $f_d$=198 hertz and threshold $\gamma$=0.2 such as may be achieved by the demodulation techniques of FIGS. 6A and 6B.

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
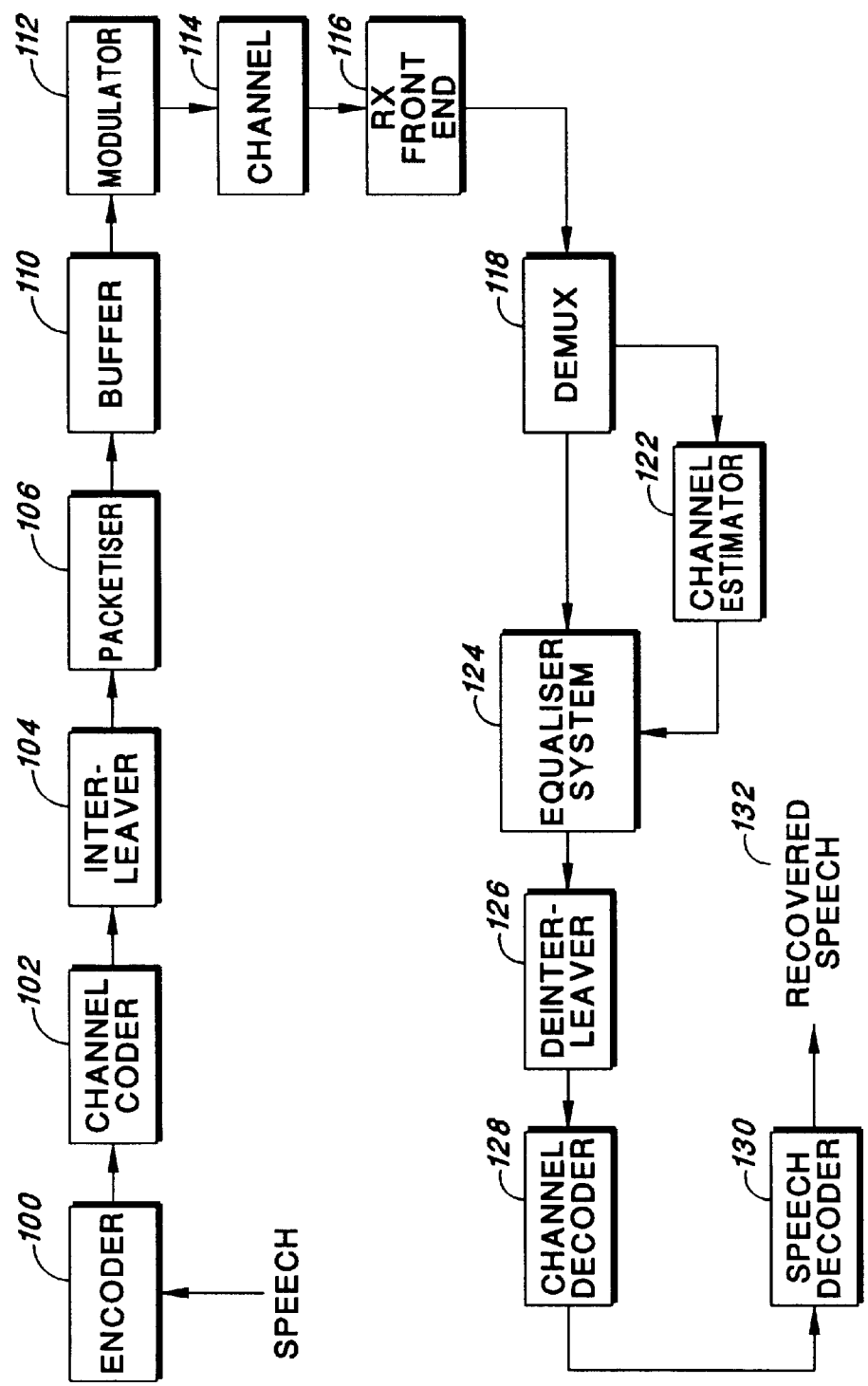
FIG. 1 is a block diagram of an exemplary Time Division Multiple Access (TDMA) mobile radio cellular system in which the present invention may be utilized.

Referring first to FIG. 1, a block diagram is shown of a hardware system for a basic Time Division Multiple Access (TDMA) communications link system which could implement an embodiment of the present invention.

FIG. 1 shows a transmitter and receiver system including: an encoder 100; a channel coder 102; an interleaver 104; a packetizer 106; a buffer 110; a modulator 112; a channel 114; a receiver front-end 116; a demultiplexer 118; a channel estimator 122; an equalizer system 124; a de-interleaver 126; a channel decoder 128; and a speech decoder 130 sending recovered speech 132. The above hardware is serially coupled together as described below.

An output of the encoder 100 is coupled to an input of the channel coder 102. An output of the channel coder 102 is also coupled serially to an input of the interleaver 104. The interleaver 104 has an output coupled to an input of the packetizer 106.

Also in series, an output of the packetizer 106 is coupled to an input of the buffer 110, which has an output coupled to an input of the modulator 112. An output of the modulator 112 is next coupled to an input of the channel 114 which has an output coupled to the receiver front-end 116.

A respective output of the receiver front-end 116 is next coupled to an input of the demultiplexer ("demux") 118, which is next coupled in parallel at respective outputs to the equalizer system 124 and to the channel estimator 122, the channel estimator 122 also having an output coupled to the equalizer system 124. Also in series, an output of the equalizer system 124 is coupled to an input of the de-interleaver 126, an output of which is coupled to an input of the channel decoder 128. Finally, an output of the channel decoder 128 is coupled to an input of the speech decoder 130 which generates recovered speech 132.

The system of FIG. 1 operates, in practice, as follows. The packetizer 106 receives digital speech which has been coded by the encoder 100 and the channel coder 102 and interleaved by the interleaver 104, at a particular transmission rate. The packetizer 106 forms packets from data over a frame duration and releases it to the buffer 110 for transmission as a data burst to the modulator 112, which passes a modulated burst (an RF signal) to the channel 114 for transmission to the front-end receiver 116. The front-end receiver 116 receives the RF signal and sends a baseband signal to the demultiplexer 118 to generate demultiplexed baseband channel data by demultiplexing the baseband signal.

Next equalization is performed at the equalizer system 124 with the aid of the channel estimator 122 that obtains a measure of a complex baseband channel impulse response. Next in series, de-interleaving is performed by the de-interleaver 126 which passes de-interleaved channel data to the channel decoder 128 and then to the speech decoder 130 to finally obtain the recovered speech 132.

Figure 2A:
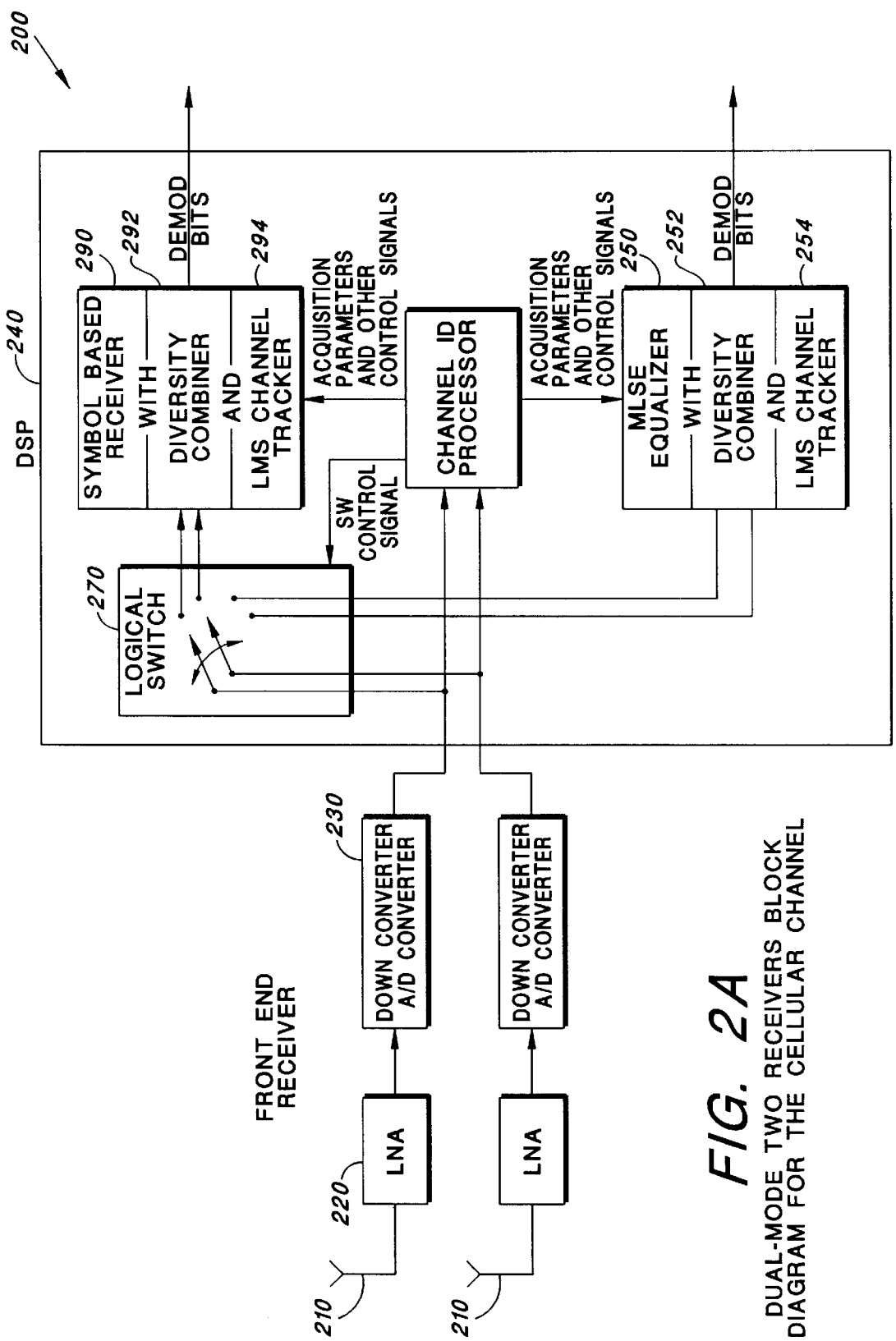
FIG. 2A is a block diagram of a dual-mode receiver structure having a two receiver structure for the cellular channel using a conventional Maximum Likelihood Sequence Estimator (MLSE) equalizer.

Referring next to FIG. 2A, a block diagram for a dual-mode receiver using a Maximum Likelihood Sequence Estimator (MLSE) Equalizer and Diversity Combiner with two antennas and two receivers (also viable with one MLSE receiver) for the cellular channel is shown. The receiver 200 comprises two antennas 210, parallel Low-Noise Amplifiers (LNA's) 220 each coupled respectively to the antennas 210; parallel converters 230 each coupled to one of the parallel Low-Noise Amplifiers (LNA's) 220 so as to receive signals from the LNA's 220; a Baseband Digital Signal Processor (Baseband DSP) 240 coupled at an input to respective outputs of the parallel converters 230 so as to receive digital signals from the parallel converters 230; a logical switch 270; and demodulated bits 280 output from the Baseband DSP 240.

The baseband DSP 240 further comprises a symbol based receiver 290, an MLSE equalizer 250 and a channel identification (ID) processor 260. The symbol-based demodulator 290 and the MLSE equalizer 250 comprise a first and second diversity combiner 292, 252, and a first and second LMS tracker 294, 254 respectively.

The down converter 230 is coupled at an output to the logical switch 270 and at another output to the channel ID processor 260. The channel ID processor 260 is coupled to the symbol based receiver 290 to send acquisition parameter and control signals to the symbol based receiver 290; to the MLSE equalizer 250 to send other acquisition parameters and control signals to the MLSE equalizer 250; and to the logical switch 270 to send a software control signal to the logical switch 270. The digital signals from the down converter 230 are routed by the logical switch 270 to either symbol based receiver 290 or to the MLSE equalizer 250, depending on the software control signal from the channel ID processor.

Bursts are received at antennas 210 and passed to LNA's 220 to amplify signals contained in the burst. The amplified signals from the LNA's 220 are passed to the baseband converters 230 which convert the signals in analog form to baseband frequencies for further A-to-D conversion by the baseband converter at converters 230. Down-converted digital samples from the baseband converter 230 are fed to respective inputs of the Baseband DSP 240 as described above.

The channel ID processor 260 in the Baseband DSP 240 is always used to calculate delay spread components or channel response estimates using a correlation method. Depending upon results of channel estimation and identification (described below) in the Baseband DSP 240, several methods of demodulation may be selected by the Baseband DSP 240. In some instances (see Table 2 below), the MLSE equalizer 250 demodulates the signal according to the conventional Maximum Likelihood Sequence Estimator (MLSE) process. The MLSE process is known by any skilled artisan in the field. Demodulated bits 280 are output from the Baseband DSP 240 by either the symbol based receiver 290 or the MLSE equalizer 250.

In another instance, the symbol-based receiver 290 demodulates the signal in a conventional manner also known by any skilled artisan in the field. The LMS Channel Tracker is used to track the channel variation during the demodulation process. The LMS process is known by any skilled artisan in the field.

Figure 2B:
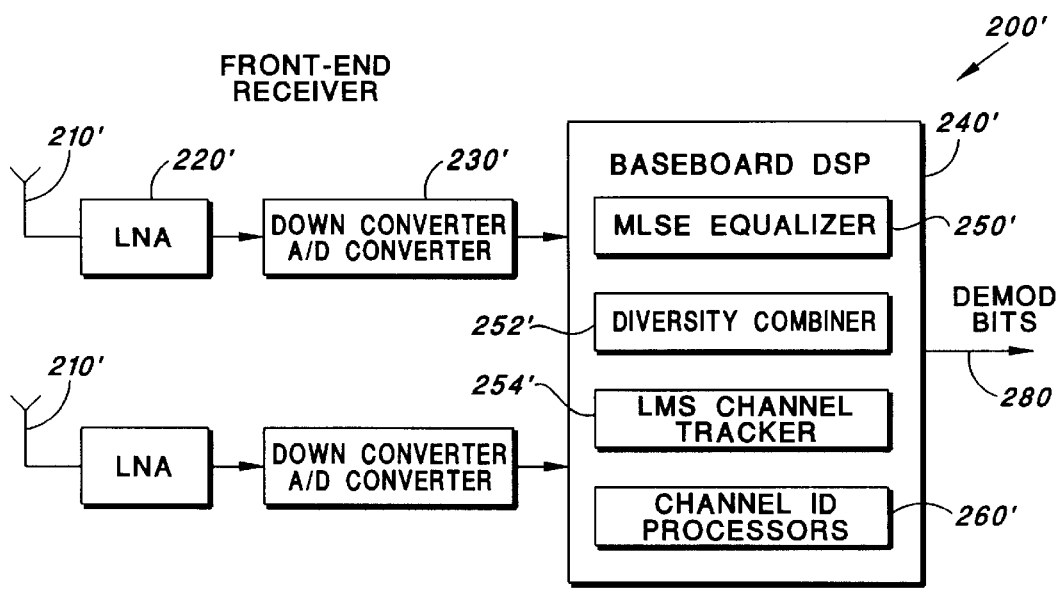
FIG. 2B is a block diagram of a dual-mode receiver structure having only one receiver for the cellular channel using a conventional Maximum Likelihood Sequence Estimator (MLSE) equalizer.

Referring next to FIG. 2B, a dual-mode unified receiver block diagram for the cellular channel is shown comprising: two antennas 210', parallel Low-Noise Amplifiers (LNA's) 220' each coupled respectively to the antennas 210'; parallel converters 230' each coupled to one of the parallel Low-Noise Amplifiers (LNA's) 220' so as to receive signals from the LNA's 220'; a Baseband Digital Signal Processor (Baseband DSP) 240' coupled at an input to respective outputs of the parallel converters 230' so as to receive digital signals from the parallel converters 230'; and demodulated bits 280' output from the Baseband DSP 240'.

The baseband DSP 240' comprises a MLSE equalizer 250' with a diversity combiner 252' an LMS channel tracker 254' and a channel ID processor 260'. Analogous processing to FIG. 2A is performed by analogous hardware components, except that instead of having a second symbol-based receiver 290, as in FIG. 2A, the baseband DSP 240' demodulates the signal using the MLSE process. Therefore a logical switch is also not necessary and channel data from the parallel connectors 230' are always directed to channel ID processor 260 and the MLSE equalizer 250.

In the conventional receiver of FIG. 1, an equivalent Baseband DSP always runs an MLSE equalizer whether or not the incoming signal is flat faded or not.

Figure 3:
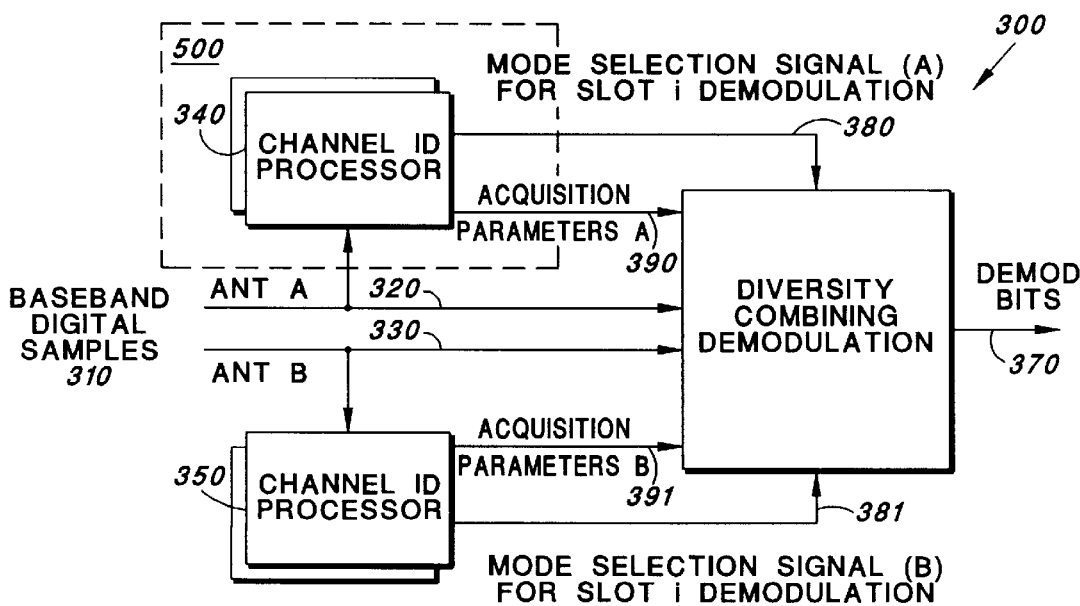
FIG. 3 is a high level block diagram of a demodulation technique supported by one embodiment of the present invention using the receiver of FIG. 2.

FIG. 3 is a high level block diagram of hardware involved in the channel classification and demodulation process using one embodiment of the method of the invention. A modified MLSE receiver 300 receives baseband digital samples 310 from Antenna A Communication Line 320 and Antenna B Communication Line 330 after appropriate, conventional filtering and/or amplification from Antenna A and B (not shown), such that the baseband digital samples are received at respective inputs to a first Channel ID Processor 340 and a second Channel ID Processor 350 respectively.

Simultaneously, baseband digital samples 310 are also fed to a Diversity Combining Demodulator 360 at respective inputs from the Antenna A Communication Line 320 and the Antenna B Communication Line 330

The first Channel ID Processor 340 and the second Channel ID Processor 350 are coupled to the Diversity Combining Demodulator 360 through respective mode selection Communication Lines for Signal A 380 and Signal B 381.

An acquisition Parameters Communication Line A 390 and on Acquisition Parameters Communication Line B 391 are coupled respectively from outputs of the first Channel ID Processor 340 and the second Channel ID Processor 350 and to respective inputs of the Diversity Combining Demodulator 360 respectively. Modulated bits 370 are output from the Diversity Combining Demodulator 360.

The function of the first and second Channel ID Processors 340, 350 is channel classification using channel response estimates first and second required components from received bursts and a mathematical model for channel classification based upon a decision variable ($\Gamma$ or $\Gamma_K$ described below) and of channel response estimates described in detail below.

The mathematical model supporting the decision variable $\Gamma$ is described in greater detail below. In general, decision variable $\Gamma$ or $\Gamma_K$ is a squared magnitude ratio of the first ray channel response estimate over the second ray channel response estimate. The general classification method is to compare the decision variable Γ to a predetermined threshold $\gamma^2$ based upon optimization requirements of the system.

Down-converted digital samples for each antenna received through the Antenna A Communication Line 320 and the Antenna B Communication Line 330 at the Channel ID Processors 340, 350 are used to perform channel identification for a particular slot i using a SYNC pattern of the received burst. The SYNC format is used to synchronize signals or bursts in a conventional communication system such as the IS-136 TDMA system.

The IS-136 reverse link (or up link) slot format is shown in FIG. 4. FIG. 4 shows a slot of 6.667 milliseconds and shows several packets of multiple symbols in their protocol. The SYNC pattern is the fourth segment of data containing fourteen (14) symbols. Each symbol contains two (2) bits. FIG. 4 is described in further detail below.

The fourteen-symbol SYNC pattern, for example, in the IS-136 TDMA system, is a fixed pattern which is conventionally used to acquire symbol timing, $f_s$ or symbol period $T_s$. A doppler effect of the SYNC pattern is determined utilizing its known pattern. The SYNC pattern 440 itself, does not contain any information, but the data on how the received burst has changed from the former received burst or from the expected timing of the burst is used to generate new information on channel parameters.

Channel parameters may include amplitude and phase information for each slot or burst relative to each other slot or burst. Channel identification processing in Channel ID Processors 340, 350 uses channel parameters estimated as part of a normal signal acquisition and demodulation process in conventional systems. Additionally, channel identification is improved by using multiple (k) burst statistics instead of single burst statistics. For example, four bursts may provide sufficient statistics in most applications.

Channel identification essentially identifies a channel as either multipath or flat-fading, and triggers an appropriate signal to select an appropriate mode of demodulation. The signals for mode selection are identified as Mode Selection Signal A (A) and Mode Selection Signal B (B) in FIG. 3. Upon receipt of Mode Selection Signal A and Mode Selection Signal B for a slot i, the Diversity Combining Demodulator 360 selects either an equalizer running MLSE or symbol-based processing. Alternatively, the MLSE equalizer is operated in one of two modes by the dual-mode unified receiver of FIG. 2B. Additionally, the Channel ID Processor 340, 350 performs demodulation based on K burst measurements and uses decision variable $\Gamma_K$ to do mode selection.

Referring next to FIG. 5, block diagram 500 for channel classification processing performed by Channel ID Processor 340 is shown. It is based on an average statistic over K (burst) channel parameter estimates. In FIG. 5, digital samples 510 are passed to a Parameter Estimator 520 (described in detail below) which estimates Channel Parameters for a slot i and outputs them to the Diversity Combining Demodulator 360 of FIG. 3.

Simultaneously, a Circular Modular Switch 530 is switchably coupled to the Parameter Estimator 520 at an input and selects a parameter set in an array 535 of circular buffers of memory order K depending on a setting of the switch 530 the buffer comprising: parameter set 540 corresponding to time slots 1 and 4; parameter set 550 corresponding to time slots 2 and 5; and parameter set 560 for time slots 3 and 6 of six (6) slots for each frame. (Multiple users are assigned specific time slots from a frame containing six (6) slots.)

The array of circular buffers 535 of memory order K is alternately a shift register of depth K. Each circular buffer 540, 550 and 560 in the array 535 is individually reset by a reset signal 565.

A reset signal 565 is triggered by a new mobile station being assigned to a digital traffic channel, or slot pair. The reset signal 565 is issued after detecting a valid traffic from an assigned mobile station to the digital traffic channel.

Another circular modular switch 570 is switchably coupled to the array 535 from one of the circular buffers 540, 550, 560 at one of their respective outputs. When circular modular switch 570 is switchably coupled to one of the circular buffers 540, 550 and 560 a parameter set containing data from a selected circular buffer 540, 550, 560, is received at the Channel Classifier 580 through the Circular Modular Switch 570.

A decision variable $\Gamma_K$ based on channel estimates from K bursts is used for ultimate channel classification and is computed as $$\Gamma_k = \frac{\sum_{i=1}^{K} |\hat{f}_1(i)|^2}{\sum_{i=1}^{K} |\hat{f}_0(i)|^2}$$

Where $\hat{f}_0$ (i) and $\hat{f}_1$ (i) are channel response estimates from an $i^{th}$ received burst. The variable $\hat{f}_0$ denotes a first ray component and $\hat{f}_1$ denotes a second ray component in a mathematical model of channel response estimation wherein the second ray component denotes a multipath component, and a first ray component denotes a primary (without delay spread) component. Both components fade independently.

Accordingly, a channel is classified as "flat-fading" if decision variable $\Gamma_K$ is less than a given threshold value $\gamma^2$ that is, $\Gamma_K \leq \gamma^2$. Otherwise, the channel is classified as a two-ray channel or a multipath channel. Threshold value $\gamma^2$ is adjusted depending on system optimization. Hence, for classification performance on the flat-fading channel, the threshold value is lowered. To increase performance on the two-ray channel the threshold value is increased. A neutral, or balanced performance is achieved by setting threshold $\gamma^2$ in such a way that a false classification probability on the flat-fading channel and a false classification probability of the two-ray are equal. These threshold values are tabulated in Table 1 below.

TABLE 1

Threshold values $\bar{\gamma}$ that give $P_1 = Q_1$ and the resulting mis-classification probabilities $P_1, \ldots, P_5$ using $\bar{\gamma}$.

| SNR<br>$\bar{\gamma}$ | 10 dB<br>0.205 | 15 dB<br>0.154 | 20 dB<br>0.115 | 25 dB<br>0.087 |
|---|---|---|---|---|
| $P_1$ | $4.0 \times 10^{-2}$ | $2.3 \times 10^{-2}$ | $1.3 \times 10^{-2}$ | $7.5 \times 10^{-3}$ |
| $P_2$ | $4.7 \times 10^{-3}$ | $1.6 \times 10^{-3}$ | $5.1 \times 10^{-4}$ | $1.7 \times 10^{-4}$ |
| $P_3$ | $6.2 \times 10^{-4}$ | $1.2 \times 10^{-4}$ | $2.1 \times 10^{-5}$ | $4.2 \times 10^{-2}$ |
| $P_4$ | $8.4 \times 10^{-5}$ | $9.5 \times 10^{-6}$ | $9.8 \times 10^{-7}$ | $1.1 \times 10^{-7}$ |
| $P_5$ | $1.2 \times 10^{-5}$ | $7.8 \times 10^{-7}$ | $4.6 \times 10^{-8}$ | $2.9 \times 10^{-9}$ |

In the channel classification algorithm used in channel classifier 580 the Channel Acquisition Parameters A and B are ordinarily required as initial values in channel tracking loops in demodulation or conventional MLSE equalizers. Hence, additional processing for the enhanced signal processing performance of embodiments of FIGS. 4 and 5 is very small.

Once channel classification is performed by the channel classifier 580 the Mode Selection Signal for slot i 590 is passed to Diversity Combining Demodulator 360.

The Mode Selection Signals A and B of FIG. 3 can select either an enable or disable for a multipath tracking switch in Diversity Combining Demodulator 360. A given combination of Mode Selection Signals A and B is used with two conceivable receiver structures.

Table 2 below is a summary of receiver demodulation of a received burst for two possible receiver configurations. In one receiver configuration there are two essential receiver structures. In another configuration, there is one unified receiver structure running a modified MLSE.

TABLE 2

Receiver Operation Summary For The Demodulation of The Received Burst For Both Two Receiver Structure And Unified One Receiver Structure.

| Mode Selection Signal | | Dual-Mode Two Receiver Structure | Dual-Mode Unified One Receiver Structure |
|---|---|---|---|
| Ant. A | Ant B | | |
| (On) enable | (On) enable | Run the modified MLSE in a conventional way. | Run the modified MLSE in a conventional way. |
| (Off) disable multi-path | (Off) disable multi-path | Run symbol-based receiver in a conventional way. | Run the modified MLSE with the following condition. For both antennas, zero-force the multi-path channel taps for MLSE demodulation and channel tracking. |
| (On) enable multi-path | (Off) disable multi-path | Run the modified MLSE with the following condition. For antenna B, zero-force the multi-path channel taps for MLSE demodulations and channel tracking. For antenna A, track all multi-path channel taps and feed the information to the MLSE in a normal way. The diversity combining will be done in a normal way with the above constraint. | Run the modified MLSE with the following condition. For antenna B, zero-force the multi-path channel taps for MLSE demodulation and channel tracking. For antenna A, track all multi-path channel taps and feed the information to the MLSE in a normal way. The diversity combining will be done in a normal way with the above constraint. |
| (Off) disable multi-path | (On) enable multi-path | Same as above with antenna A and B roles switched. | Same as above with antenna A and B roles switched. |

In both configurations, a modified MLSE is used. Table 2 below shows a summary of the standard operational processes used in each of two alternate configurations for running the modified MLSE receiver. The modified MLSE has a standard trellis structure for demodulation. However, a channel tracking algorithm has a switch (not shown) to enable or disable tracking of multipath components in channel responses. The switch enables or disables multipath tracking in the channel tracking algorithm within the Diversity Combining Demodulator 360.

The switch is triggered by Mode Selection Signal A and Mode Selection Signal B of FIG. 3. When the channel tracking switch is off or "disabled", only the first ray component path is tracked, and the multipath channel (second ray) components are not tracked. On the other hand, if the channel tracking switch is on (or "enabled"), all multipath channel components are tracked.

The tracking is done by a Least Mean Square (LMS) channel tracking algorithm within the Diversity Combining Demodulator 360 of FIG. 3. An MLSE equalization in the Diversity Combining Demodulator 360 is performed in a standard way when the channel tracking switch is enabled. The channel tracking switch is activated independently by Antenna A and Antenna B. The LMS Algorithms are known by skilled artisans in the field for tracking.

Signal and Channel Model

The signal model for the multipath communication channels of a radio transmission is modeled as Equation 1

$$s(t) = \text{Re}\{\tilde{s}(t)\exp(j\omega_c t)\} \quad (1)$$

where $\omega_c$ is a carrier frequency and $\tilde{S}(t)$ is a base-band modulation on the transmitted signal which is given by $$\tilde{s}(t) = \sum_{i=-\infty}^{\infty} d_i h(t - iT_s) \quad (2)$$

In Equation 2, $d_1$ is a transmitted data sequence; $h(t)$ is a symbol waveform; and $T_s$ is a symbol time interval. The transmitted signal s(t) passes through a multipath channel having a baseband equivalent channel response c(t). Equation 3 following, represents a response of $h(\tau)$ and c(t):

$$h_T(t) = \int_{-\infty}^{\infty} h(\tau)c(t-\tau)d\tau \quad (3)$$

A received signal r(t), observed at a receiver is of the form $$r(t) = \text{Re}\{\tilde{r}(t)\exp(j\omega_c t)\} \quad (4)$$

where a base-band equivalent signal $\tilde{r}(t)$ is given by:

$$\tilde{r}(t) = \sum_{i=-\infty}^{\infty} d_i h_T(t - iT_s) + \tilde{n}(t) \quad (5)$$

wherein $\tilde{n}(t)$ represents an equivalent base-band signal for extraneous signals and receiver noise. The variable $\tilde{n}(t)$ in the received signal mathematical model is modeled as a mean zero complex Gaussian with correlation function $N_0\delta(\tau)$.

At the receiver, the received signal r(t) of Equation 4 is passed through a receiving filter $h_R(t)$ which samples are taken every $T_s$ seconds, such as by the use of a periodic switch.

The sample sequence $\{y_i\}$ can be represented as $$y_i \stackrel{\Delta}{=} y(iT_s - t_D) \quad (6)$$

$$= \sum_{j=0}^{J-1} d_{i-j} x_j + n_i \quad (7)$$

where a discrete channel response $\{X_j\}$ are samples of the total channel response x(t) given by $$x(t) = \int_{-\infty}^{\infty} h_T(\tau)h_R(t-\tau)d\tau \quad (8)$$

taken at $\tau = jT_s - t_D$, $j=0, \ldots, J-1$, and $n_i$ is given by $$n_i = \int_{-\infty}^{\infty} \tilde{n}(\tau)h_R(iT_s - t_D - \tau)d\tau \quad (9)$$

One of the typical channel models is a two-ray model adopted for the IS-136 standard. In this case, an equivalent discrete channel response $\{x_j\}$ in Equation 7 above is represented as a 2-tuple vector $\underline{x}=[x_0, x_1]^T$. Components $x_0$ and $x_1$ respectively, represent individual channel responses both without delay and with one symbol delay, and are independent complex Gaussian variables with mean 0.

A bandwidth of underlying Gaussian processes is determined by a speed of the mobile station and its carrier frequency. Noise samples are uncorrelated, i.e., $E\{n_i n_j^*\}= N_0 \delta_{ij}$.

A flat-fading channel with no delay spread has channel response characteristics $x_1=0$ and $E\{|x_0|^2\}=1$. Changing channel characteristics in a mobile cellular environment is modeled as a channel which switches between the two modes of single ray (or "flat-fading") and two-ray (two-ray spread, or "multipath") characteristics. Channel switching of rays is slow compared to a TDMA burst duration so the channel stays in one mode over several bursts.

Since a channel mode is unknown, a typical receiver structure uses the MLSE to compensate for possible delay spread. Therefore, the IS-136 specification requires equalization for measuring receiver performance for flat-fading channels if the receiver is equipped with some form of equalizer.

If $\hat{x}_0$ and $\hat{x}_1$ denotes estimates of $x_0$ and $x_1$ respectively, a two tap MLSE receiver with a Channel Identification Processor 340, 350 providing estimates of $[\hat{x}_1\ \hat{x}_0]$ to the receiver is used to perform channel identification and mode selection as a result thereof.

The channel response vector $\underline{x}$ is initially estimated using a training sequence which is a unique word and tracked for an entire burst of detection using appropriate adaptive algorithms, such as the LMS method.

The SYNC pattern of FIG. 4 is a training sequence or unique word that can be used for this purpose. For a given training sequence $d_0, d_1, \ldots, d_L$ of length L+1 in each traffic slot $\tau$ denotes a set of symbol indices $\{1, \ldots L\}$, and vector $\underline{d}_l=[d_l, d_{l-1}]^t$ denotes a set of two consecutive data symbols for 1 an element of $\tau$ ($l \in \tau$).

The correlation matrix $R_t$ out of a training sequence is defined as $$R_T = \sum_{l \in T} \underline{d}_l^* \underline{d}_l^t = \begin{bmatrix} L & \rho \\ \rho^* & L \end{bmatrix} \quad (10)$$

where $\rho$ equals the summation $$\sum_{l \in T} d_l^* d_{l-1}$$

and the cross-correlation vector $\underline{c}_t$ is defined as $$\underline{c}_T = \sum_{l \in T} \underline{d}_l^* y_l. \quad (11)$$

A Maximum Likelihood Estimate $\hat{\underline{x}} = [\hat{x}_0\ \hat{x}_1]^t$ of channel response $\underline{x} = [x_0\ x_1]^t$ is then computed as $$\hat{\underline{x}} = R_T^{-1} \underline{c}_T \quad (12)$$

The estimates $\hat{\underline{x}}$ is used as an initial MLSE tap weight and are subsequently updated using an LMS algorithm in the LMS channel tracker 270 of FIG. 2.

The channel response estimates $\hat{\underline{x}}$ from the training sequence, or SYNC pattern of FIG. 4, is also used to identify whether the channel is flat-fading or two way fading. The decision variable $\Gamma_1$ for a first slot channel classification is defined as a squared magnitude ratio of the two independent channel response estimates at any given slot, i.e., $$\Gamma_1 = |\hat{x}_1|^2 / |\hat{x}_0|^2 \quad (13)$$

For each burst, the decision variable is computed using the received signal and known training sequence (the SYNC pattern), and is compared against a set threshold. Classification is then based upon the decision variable and a mode of the receiver is next selected.

The two receiver modes, modified MLSE equalization, or symbol-based detection, is performed at the receiver depending upon how the decision variables compares against the set threshold. The two receiver modes share MLSE structure by disabling a delayed tap in symbol-based mode.

For a more reliable estimation, channel classification is performed using channel estimates from multiple bursts. In this case, $\hat{x}_0(k)$ and $\hat{x}_1(k)$ denote the channel response estimates for the $k^{th}$ received burst.

Next, k-slot-averaged decision variable, $\Gamma_K$, is defined as $$\Gamma_K = \frac{\sum_{k=1}^{K} |\hat{x}_1(k)|^2}{\sum_{k=1}^{K} |\hat{x}_0(k)|^2} \quad (14)$$

Next, the set threshold, $\gamma^2$ is used to identify a flat-fading channel if $\Gamma_K$ is smaller than $\gamma^2$. Symbol detection is then performed for the flat-fading channel.

Otherwise, the channels classified as multipath, or two-ray fading, and MLSE equalization takes place.

Multipath channel with discrete timed channel model represented as $y_i = x_0 d_i + x_1 d_{i-1} + n_i$ has a cross correlation vector $\underline{c}_t$ represented by Equation 15 below.

$$\underline{c}_T = \begin{bmatrix} \sum_{l \in T} d_l^* (x_0 d_l + x_1 d_{l-1} + n_l) \\ \sum_{l \in T} d_{l-1}^* (x_0 d_l + x_0 d_{l-1} + n_l) \end{bmatrix} \quad (15)$$

$$= \begin{bmatrix} L x_0 + \rho x_1 + \xi_0 \\ \rho^* x_0 + L x_1 + \xi_1 \end{bmatrix}$$

where $\xi_0 = \Sigma_{t \in \tau} d_l^* n_l$ and $\xi_1 = \Sigma_{t \in \tau} d_{l-1}^* n_l$.
Estimation noise is further defined as:

$$\eta_0 = \frac{L \xi_0 - \rho \xi_1}{L^2 - |\rho|^2} \quad (16)$$

and $$\eta_1 = \frac{L \xi_1 - \rho^* \xi_0}{L^2 - |\rho|^2}$$

which are complex Gaussian $$\eta_1 = \frac{L \xi_1 - \rho^* \xi_0}{L^2 - |\rho|^2}.$$

The channel response estimate given in Equation 12 is represented as Equation 17 below $$\begin{bmatrix} \hat{x}_0 \\ \hat{x}_1 \end{bmatrix} = \frac{1}{L^2 - |\rho|^2} \begin{bmatrix} L & -\rho \\ -\rho^* & L \end{bmatrix} \begin{bmatrix} Lx_0 + \rho x_1 + \xi_0 \\ \rho^* x_0 + Lx_1 + \xi_1 \end{bmatrix} \quad (17)$$

$$= \frac{1}{L^2 - |\rho|^2} \begin{bmatrix} (L^2 - |\rho|^2)x_0 + L\xi_0 - \rho\xi_1 \\ (L^2 - |\rho|^2)x_1 + L\xi_1 - \rho^*\xi_0 \end{bmatrix}$$

$$= \begin{bmatrix} x_0 + \eta_0 \\ x_1 + \eta_1 \end{bmatrix}$$

Using Equation 16 a variance $\sigma^2$ of estimation noise $\eta_0$ and $\eta_1$ is shown to be $\sigma^2 = LN_0/(L^2-|\rho|^2)$, where $N_0$ is the variance of the noise samples $\{n_i\}$.

When $\rho$ is equal to zero, which is a necessary and sufficient condition for an optimal training sequence in order to estimate the two-ray fading channel, estimation noise $\eta_0$ and $\eta_1$ are uncorrelated and thus, independent, that is, $E[\eta_0 \eta_1^*]0$.

Including estimation noise, the decision variable $\Gamma_K$ becomes:

$$\Gamma_K = \frac{\sum_{k=1}^{K} |x_1 + \eta_1|^2}{\sum_{k=1}^{K} |x_0 + \eta_0|^2} \quad (18)$$

Both a numerator and denominator terms in Equation 18 follow a Chi-square distribution of 2 K degrees of freedom, with $x_0+\eta_0$ and $x_1+\eta_1$ being complex Gaussian random variable. Since the ratio of two independent chi-squared random variables follow an F-distribution, $\gamma_K$ in Equation 18 is an F-distributed random variable for appropriately designed training sequences with $\rho=0$. The value of Gaussian variables $x_0+\eta_0$ and $x_1+\eta_1$ in Equation 18 are $1+\sigma^2$ and $1+\sigma^2$ respectively, where $\sigma$ is the variance of estimated noise $\eta_0$ and $\eta_1$.

For an F-distributed random variable Z such that a numerator and denominator are chi-squared distributed with degrees of freedom 2n and 2m respectively, accumulative density function is known as $$Pr\{Z \le z^2\} = 1 - \frac{1}{B(n, m)} \sum_{j=0}^{m-1} \binom{m-1}{j} \frac{(-1)^j}{n+j} \left(\frac{c^2}{c^2 + z^2}\right)^{n+j} \quad (19)$$

where $c^2 = \sigma_1^2/\sigma_2^2$ and is a ratio of variance $\sigma_1^2$ of the underlying Gaussian for numerator and the variance $\sigma_1^2$ of the underlying Gaussian for the denominator, and $$B(n, m) = \int_0^1 t^{n-1}(1-t)^{m-1} dt \text{ is a Beta function.}$$

Defining $P_K$ as a probability of the two-ray fading channel is mis-classified as the flat-fading channel using decision variables $\Gamma_K$ and threshold $\gamma^2$, Equation 20 results.

$$P_K = Pr\{\Gamma_K \le \gamma_2\} \quad (20)$$

$$= 1 - \frac{1}{B(K, K)} \sum_{j=0}^{K-1} \binom{K-1}{j} \frac{(-1)^j}{K+j} \left(\frac{1}{1+\gamma^2}\right)^{K+j}$$

For the flat-fading channel with no delay spread, the received samples are modeled as $y_i = x_0 d_i + n_i$. In this case, cross correlation vector $\underline{C}_T$ is Equation 21

$$\underline{c}_T = \begin{bmatrix} \sum_{l \in T} d_l^*(x_0 d_l + n_l) \\ \sum_{l \in T} d_{l-1}^*(x_0 d_l + n_l) \end{bmatrix} = \begin{bmatrix} Lx_0 + \xi_0 \\ \rho^* x_0 + \xi_1 \end{bmatrix} \quad (21)$$

and the channel estimates become Equation 22:

$$\begin{bmatrix} \hat{x}_0 \\ \hat{x}_1 \end{bmatrix} = \frac{1}{L^2 - |\rho|^2} \begin{bmatrix} L & -\rho \\ -\rho^* & L \end{bmatrix} \begin{bmatrix} Lx_0 + \xi_0 \\ \rho^* x_0 + \xi_1 \end{bmatrix} \quad (22)$$

$$= \frac{1}{L^2 - |\rho|^2} \begin{bmatrix} (L^2 - |\rho|^2)x_0 + L\xi_0 - \rho\xi_1 \\ L\xi_1 - \rho^*\xi_0 \end{bmatrix}$$

$$= \begin{bmatrix} x_0 + \eta_0 \\ \eta_1 \end{bmatrix}$$

The decision variable $\Gamma_K$ under the flat-fading condition is then Equation 23

$$\Gamma_K = \frac{\sum_{k=1}^{K} |\eta_1|^2}{\sum_{k=1}^{K} |x_0 + \eta_0|^2} \quad (23)$$

which follows the F-distribution with the numerator and denominator of Chi-squared random variables respectively having degrees of freedom 2K. The variances of underlying Gaussian for the numerator and denominator are $\sigma^2$ and $1+\sigma^2$ respectively.

A probability of $Q_K$ that the flat-fading channel is mis-classified as a two-ray fading channels using decision variables $\Gamma_K$ and threshold $\gamma^2$ can be similarly obtained from Equation 19 as Equation 24

$$Q_K = Pr\{\Gamma_K > \gamma_2\} \quad (24)$$

$$= 1 - \frac{1}{B(K, K)} \sum_{j=0}^{K-1} \binom{K-1}{j} \frac{(-1)^j}{K+j} \left(\frac{c^2}{c^2 + \gamma^2}\right)^{K+j}$$

where $$c^2 = \sigma^2/(1+\sigma^2) \quad (25)$$

Mis-classification probabilities P(K) and Q(K) in Equations 20 and 24 are evaluated as functions of K and $\gamma$ at different signal to noise ratios. The IS-136 traffic slot includes 14 symbol long training sequence to relate SNR to variance in Equation 25 $\bar{\gamma}$ using L=14. SNR values here are per path SNR and an overall signal power for the two way channel is twice the signal power for the flat-fading channel for a given SNR. To minimize $P_K$ and $Q_K$ at the same time, threshold values need to satisfy $P_K = Q_k$ shown in Table 1 above.

With this threshold, $Q_k$ for K≠1 is also very close to the $P_k$. Note $\bar{\gamma}$ decreases as SNR increases, since the expected value of $\Gamma_K$ under the flat fading condition approaches zero at high SNR. Mis-classification probabilities decrease rapidly as more number of slots are used for decision, and $10^{-5}$ probability is achievable with K=5 or less.

Figure 6A:
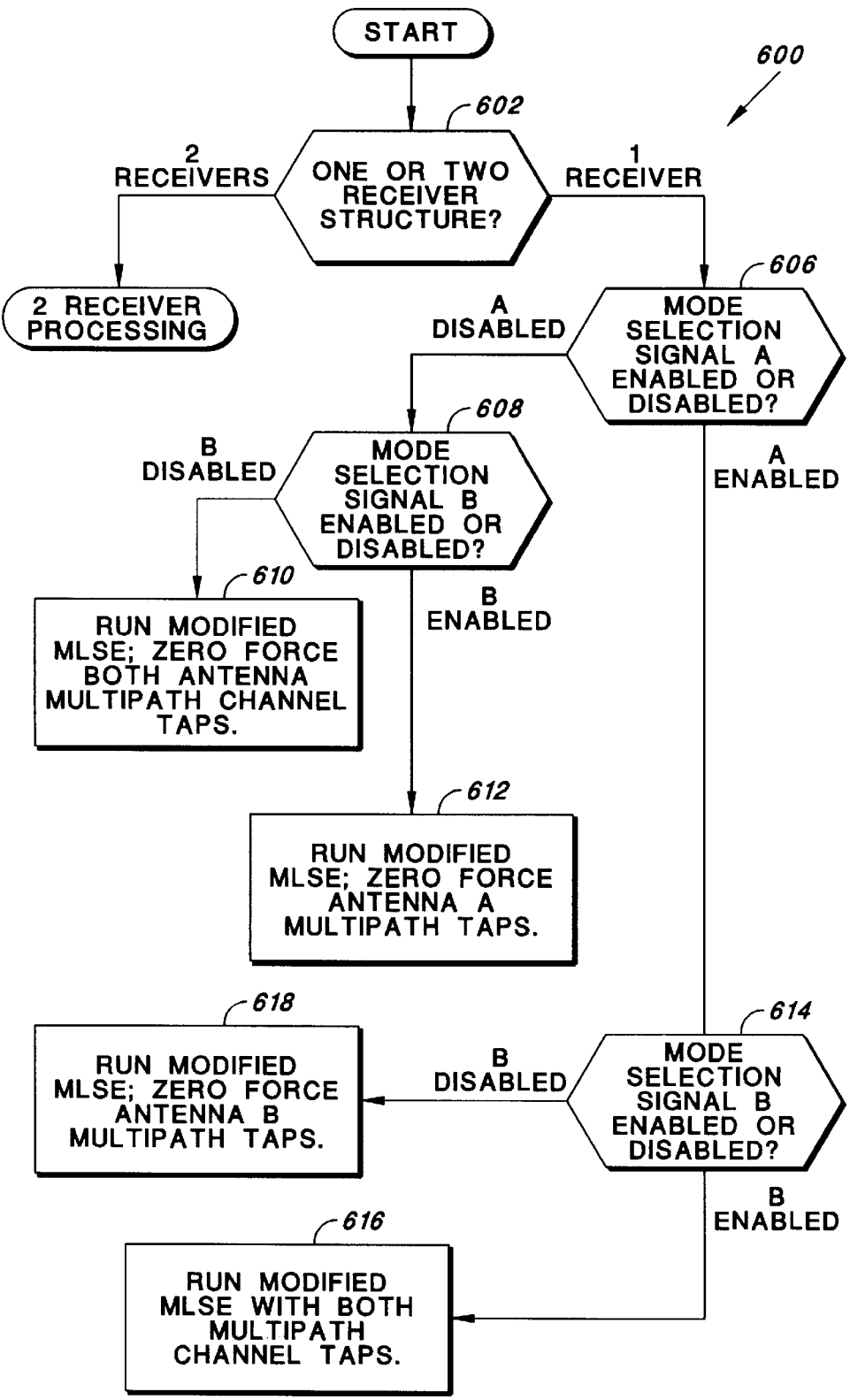
FIG. 6A is a flow chart detailing a demodulation technique using a one receiver structure such as the receiver of FIG. 2B and a Maximum Likelihood Sequence Estimator (MLSE)

Referring next to FIG. 6A, a flow chart of a modified receiver operational processing sequence is shown which reflects the tabulated operation summary of Table 2 above.

In flow chart 600, a decision branch first determines whether one or two receiver structures are present (602). If a one receiver structure is present, i.e., a unified receiver structure employing a modified MLSE equalizer is present, a Mode Selection Signal A Decision ("Decision A") branch is executed (606). If Decision A selects "A enabled" a First Mode Selection Signal B Decision branch ("First Decision B") (614) is executed. If Decision A is selected as "A disabled" a Second Mode Selection Signal B decision branch (Second Decision B) (608) is alternately executed.

If Second Decision B (608) is set to "B enabled" and Decision A is "A disabled", the Diversity Combining Demodulator 360 of FIG. 3 runs a modified MLSE equalizer after zero forcing multipath channel taps (not shown) corresponding to Antenna A (612).

If Second Decision B is "B (608) disabled" with "A disabled", the MLSE equalizer runs the modified MLSE and zero forces both antenna multipath channel taps (610).

If Decision A (606) is "A enabled" and First Decision B (614) is set to "B enabled" for the one receiver configuration then the MLSE equalizer runs the modified MLSE with both multipath channel taps (616).

If Decision A (606) is "A enabled" and First Decision B (614) is "B disabled" for one receiver, a modified MLSE is run after zero forcing multipath taps of Antenna B (618).

Figure 6B:
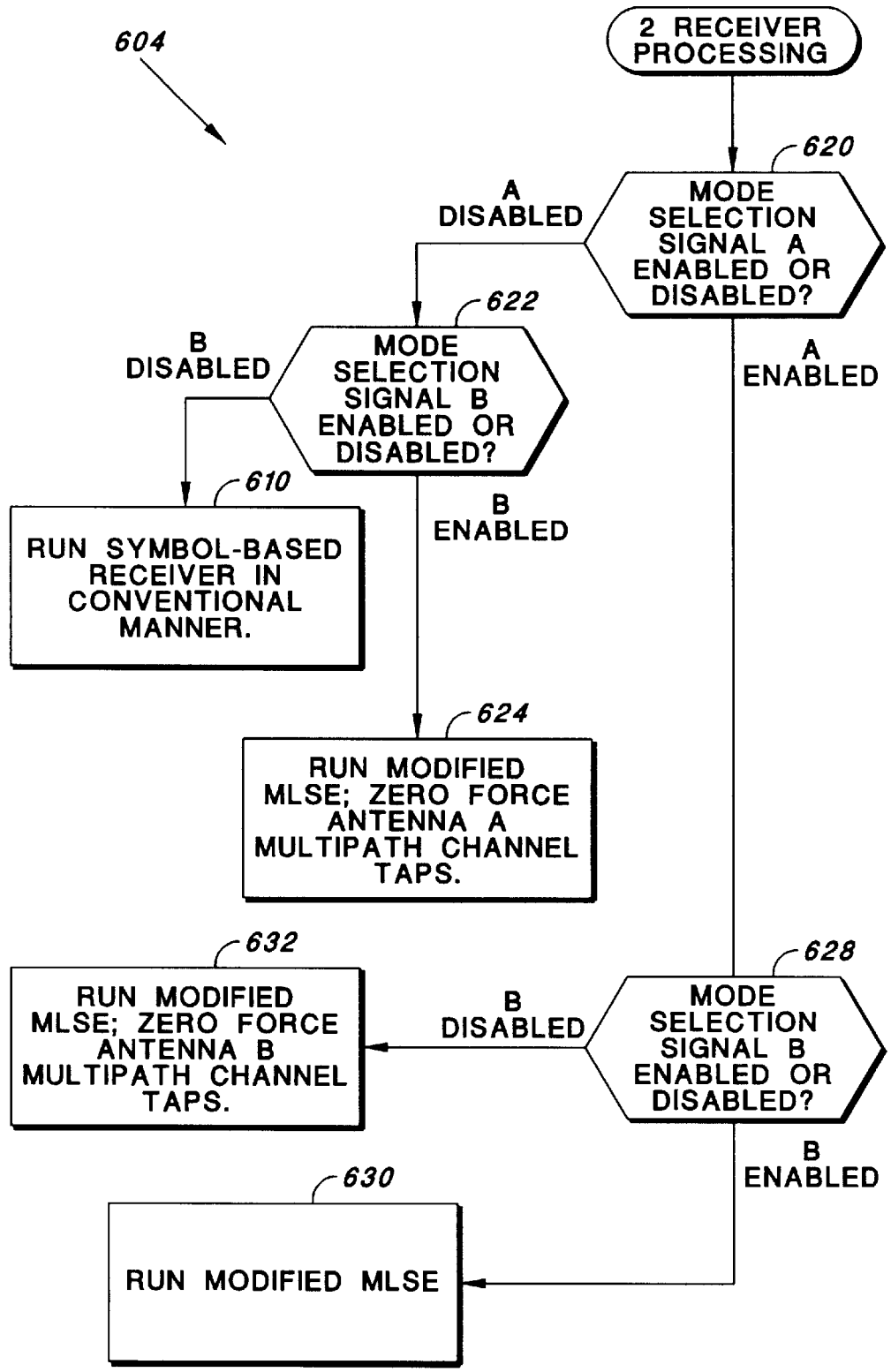
FIG. 6B is a flow chart detailing a demodulation technique using mode selection and the dual-mode receiver structure of FIG. 2A.

Referring next to FIG. 6B, a technique for two receiver processing (604) is illustrated using a two receiver configuration such as in FIG. 2A. FIG. 6B shows a two receiver operational flow chart. Another Mode Selection Signal A Decision (Other Decision A) branch (620) is first executed in FIG. 6B. If "A enabled", another first Mode Selection Signal B Decision (Other First Decision B) branch is executed (628).

If A is "enabled" and B is "disabled", a modified MLSE is run after zero forcing Antenna B multipath channel tap (632). If A is "enabled" and B is "enabled", the modified MLSE equalizer is run without zero forcing any multipath channel taps (630).

If "A disabled", another Mode Selection Signal B Decision (Other Second Decision B) branch (622) is executed instead. If A is "disabled" and B is "enabled", the modified MLSE is executed after zero forcing Antenna A multipath channel taps (624). If A is "disabled" and B is "disabled", a symbol-based receiver is run in the conventional manner (626).

In either configuration, whether both multipath antenna channel taps are zero forced or the symbol-based receiver is employed, performance in demodulating flat-fading channels is improved over prior demodulation schemes employing a conventional MLSE equalizer.

The channel classification scheme used in the Channel Classification Processor 540 of FIG. 5 within the Channel ID Processor 340 of FIG. 3, uses a signal model discussed below in detail to derive a decision variable $\Gamma_K$ from time averaged values of initial channel parameter estimates of either single or multiple traffic slots (6.67 milliseconds) using a training sequence of fourteen (14) symbols such as the SYNC pattern described above.

FIGS. 7 and 8 graphically represent mis-classification probabilities $P_k$ and $Q_k$ for the cases of 10 dB SNR and 20 dB SNR, which indicate that threshold for $P_k=Q_k$ for a given SNR is fixed regardless of K. As can be seen from both (11) and the figures, $P_k$ is independent of the channel noise level. The curves in the figures are plotted versus $\gamma$ as opposed to $\gamma^2$.

The demodulated Bit Error Rate (BER) of the improved scheme has been simulated using the IS-136 slot format transmitted over two channel models considered herein. Data symbols are raised-cosine filtered by the matched filter 122 with a roll-off factor of 0.35 and transmitted over the flat fading and two-ray fading channels having a Doppler spread 184 Hz. This Doppler spread corresponds to the fading rate experienced by a mobile moving at 100 km/h with 1.9 GHz carrier frequency (PCS band). The receiver performs matched filtering (122) then feeds the filtered samples to the combined MLSE/symbol-detection demodulator 300. Two antenna diversity is used at the receiver 200 and the samples are optimally combined at Diversity Combiner 260 for demodulation using the estimated signal strength from each Antenna 210. Symbol arrival time is assumed to be known. FIGS. 9 and 10 respectively show the BER performance of the improved scheme for the flat fading channel using threshold $\gamma=0.2$. Each figure lists BER curves for the MLSE, symbol-based demodulation, and the combined method with K=1, 2 and 3. The simulation result confirms that desired performance for both the flat and two-ray fading channels is achieved with relatively small values of K; the BER of the new scheme approaches the symbol-detection performance for the flat fading channel, and approaches the MLSE performance for the two-ray channel.

While the invention herein disclosed has been described by means of specific embodiments and applications thereof, numerous modifications and variations could be made thereto by those skilled in the art without departing from the scope of the invention set forth in the claims.

What is claimed is:

1. A dual-mode receiver for demodulating both flat-fading and multipath signals in a communications system, the dual-mode receiver comprising:
    a Baseband Digital Signal Processor (DSP) further comprising:
    a Channel Identification Processor, the Channel Identification Processor computing a first ray channel response $x_0$ and a second ray channel response $x_1$, and computing a Maximum Likelihood Estimate $\hat{\underline{x}} = (\hat{x}_0 \; \hat{x}_1)^t$, t denoting a transpose, and determining one of a group of demodulation modes based upon a value of a squared magnitude ratio $\Gamma$ of $\hat{x}_1$ and $\hat{x}_0$ relative to a predetermined threshold based upon system optimization requirements.

2. The dual-mode receiver of claim 1 wherein a single slot squared magnitude ratio $\Gamma_1$ for a single received slot is $$\Gamma_1 = |\hat{x}_1|^2 / |\hat{x}_0|^2$$

3. The dual-mode receiver of claim 1 wherein a multiple slot squared magnitude ratio $\Gamma_K$ for a plurality of k slots up to a maximum K slots is $$\Gamma_K = \frac{\sum_{k=1}^{K} |\hat{x}_1(k)|^2}{\sum_{k=1}^{K} |\hat{x}_0(k)|^2}.$$

4. The dual-mode receiver of claim 3 further comprising a Diversity Combiner wherein the Channel Identification Processor sends a mode selection signal to the Diversity Combiner identifying the determined demodulation mode.

5. The dual-mode receiver of claim 4 further comprising:
    an Equalizer coupled to the Diversity Combiner for demodulating the multi-path signals according to a Maximum Likelihood Sequence Estimation (MLSE) process; and a Channel Tracker coupled to the Diversity Combiner for updating channel information.

6. The dual-mode receiver of claim 5 further comprising a plurality of multipath channel taps for each of a group of antennas coupled to the receiver, and wherein selected ones of the plurality of multipath channel taps are zero-forced depending upon the mode selection signal.

7. The dual-mode receiver of claim 6 wherein the Channel Identification Processor comprises a First Channel Identification Processor and a Second Channel Identification Processor;

a first antenna coupled to the First Channel Identification Processor and to the Diversity Combiner receives baseband digital samples, the First Channel Identification Processor sending a first mode selection signal A to the Diversity Combiner;

a second antenna coupled to the Second Channel Identification Processor and to the Diversity Combiner receives baseband digital samples, the Second Channel Identification Processor sending a second mode selection signal B to the Diversity Combiner.

8. The dual-mode receiver of claim 7 wherein the first mode selection signal A is set to enable the first Antenna multipath channel taps, the second mode selection signal B is set to enable the second Antenna multipath channel taps, and wherein the Diversity Combiner performs Maximum Likelihood Sequence Estimator (MLSE) equalization on the received baseband digital samples from the first and second antenna to nearly optimize the demodulation of a multipath signal.

9. The dual-mode receiver of claim 7 wherein the first mode selection signal A is set to disable the first Antenna multipath channel taps, the second mode selection signal B is set to disable the second Antenna multipath channel taps, and wherein the dual-mode receiver further comprises a symbol-based receiver coupled to the Baseband DSP to nearly optimize demodulation of the received baseband digital samples.

10. The dual-mode receiver of claim 7 wherein the first mode selection signal A is set to disable the first Antenna multipath channel taps and the second mode selection signal B is set to disable the second Antenna multipath channel taps, and wherein the Diversity Combiner zero-forces the first Antenna and the second Antenna multipath channel taps before running the Maximum Likelihood Sequence Estimation (MLSE) Equalizer to optimize demodulation of the received baseband digital samples.

11. The dual-mode receiver of claim 7 wherein the first mode selection signal A is set to enable the first Antenna multipath channel taps and the second mode selection signal B is set to disable the second Antenna multipath channel taps, and wherein the Diversity Combiner zero-forces the second Antenna multipath channel taps before running the Maximum Likelihood Sequence Estimation (MLSE) Equalizer to optimize demodulation of the received baseband digital samples.

12. The dual-mode receiver of claim 1 wherein the Maximum Likelihood Sequence Estimation (MLSE) process is performed according to a channel estimation model wherein:

$$\hat{\underline{x}} = (\hat{x}_0 \ \hat{x}_1)^t = \begin{bmatrix} L & \sum_{l \in \tau} d_l^* d_{l-1} \\ \sum_{l \in \tau} d_l d_{l-1}^* & L \end{bmatrix}^{-1} \begin{bmatrix} \sum_{l \in \tau} d_l^* y_l \\ \sum_{l \in \tau} d_{l-1}^* y_l \end{bmatrix}$$

and wherein $y_l$ denotes modeled received samples, $d_l$ denotes training sequence symbols for a sequence element l, an element of a sequence of length L+1, and $\tau$ denotes a set of symbol indexes represented as $\{1 \ldots, L\}$.

13. A method for dual-mode demodulation for both flat-fading and multipath signals in a communications system (FIG. 1), the method comprising:

computing a first ray channel response estimate $x_0$ and a second ray channel response estimate $x_1$ at a channel ID processor;

computing a Maximum Likelihood Sequence Estimate $\hat{\underline{x}} = (\hat{x}_0 \ \hat{x}_1)^t$ of $x_1$ and $x_0$, t denoting a transpose, at a Channel Identification Processor; and determining one of a group of demodulation modes based upon a value of a squared magnitude ratio $\Gamma$ of $\hat{x}_1$ and $\hat{x}_0$ relative to a predetermined threshold based upon system optimization requirements.

14. The method of claim 13 wherein the step of determining includes computing a value $\Gamma_1$ of a single slot squared magnitude ratio for a single slot as:

$$\Gamma_1 = |\hat{x}_1|^2/|\hat{x}_0|^2.$$

15. The method of claim 13 wherein the step of determining includes computing a value $\Gamma_K$ of a multiple slot squared magnitude ratio for a plurality of slots as:

$$\Gamma_K = \frac{\sum_{k=1}^{K} |\hat{x}_1(k)|^2}{\sum_{k=1}^{K} |\hat{x}_0(k)|^2}.$$

16. The method of claim 15 further including the step of sending a mode selection signal from the Channel Identification Processor to the Diversity Combiner to identify the determined demodulation mode.

17. The method of claim 16 further including the steps of:
receiving signals at a first antenna;
receiving signals at a second antenna;
zero-forcing selected ones of a plurality of multipath channel taps for each of the first and second antennas, the first antenna coupled to a first channel Identification Processor, and the second antenna coupled to a second channel Identification Processor, the zero-forcing depending upon the mode selection signal.

18. The method of claim 17 further including the steps of:
sending a first mode selection signal from the first channel identification processor to the Diversity Combiner; and
sending a second mode selection signal from the second channel identification processor to the Diversity Combiner.

19. The method of claim 18 further including the steps of:
enabling multipath channel taps associated with the first antenna;
enabling multipath channel taps associated with the second antenna; and
performing Maximum Likelihood Sequence Estimation (MLSE) equalization on received baseband digital samples from the first and second antenna to nearly optimize the demodulation of a multipath signal.

20. The method of claim 18 further including the steps of:

disabling multipath channel taps associated with the first antenna;

disabling multipath channel taps associated with the second antenna; and performing symbol-based demodulation upon received baseband digital samples to nearly optimize demodulation.

21. The method of claim 18 further including the steps of:

disabling multipath channel taps associated with the first antenna;

disabling multipath channel taps associated with the second antenna; and zero-forcing the first antenna multipath taps and the second antenna multipath channel taps; and performing Maximum Likelihood Sequence Estimation (MLSE) equalization upon received baseband digital samples.

22. The method of claim 18 including the steps of:

enabling the first antenna multipath channel taps;

disabling the second antenna multipath channel taps;

zero-forcing the second antenna multipath channel taps; and performing Maximum Likelihood Sequence Estimation (MLSE) equalization to optimize demodulation of the received baseband digital samples.

* * * * *